United States Patent [19]

Shan-Liang

[11] Patent Number: 4,750,696

[45] Date of Patent: Jun. 14, 1988

[54] MILK-BOTTLE HOLDERS

[76] Inventor: Lee Shan-Liang, No. 187, Tzu Liang Mial, Tzu Lung Li, Chia-Li, Tainan, Taiwan

[21] Appl. No.: 38,678

[22] Filed: Apr. 15, 1987

[51] Int. Cl.⁴ .............................................. B64C 25/10

[52] U.S. Cl. .................................... 248/102; 248/103; 248/105

[58] Field of Search ............... 248/102, 103, 104, 105, 248/106, 107; 128/1 R

[56] References Cited

U.S. PATENT DOCUMENTS

| | | | |
|---|---|---|---|
| 1,287,125 | 12/1918 | Smith | 248/102 |
| 2,880,950 | 4/1959 | Williams et al. | 248/102 |
| 3,298,648 | 1/1967 | Sepanski | 248/103 |
| 3,298,649 | 1/1967 | Paglee | 248/103 |
| 4,405,106 | 9/1983 | Adler | 248/102 |
| 4,513,935 | 4/1985 | Aguirre | 248/102 |

*Primary Examiner*—Ramon O. Ramirez
*Attorney, Agent, or Firm*—Varndell Legal Group

[57] ABSTRACT

The present invention is directed to a baby bottle holder which comprises a baby grasper and a baby bottle holder with a bottle clamp; the baby grasper is put around a baby's body and has two protruding lengthwise edges, a flattened middle section with an arch curvature about its thickness and a curved slot under and along one of the edges; the bottle holder comprises a bottle clamp and an attachment section having a ball covered by a cover with a bolt which is put through the curved slot. The bottle holder can be screwed tightly on the baby grasper by tightening a nut on the bolt. The location of the bottle holder on the baby grasper can be changed to any location along the slot.

2 Claims, 4 Drawing Sheets

MILK-BOTTLE HOLDERS

BACKGROUND OF THE INVENTION

Mothers who have just given birth are always weak in health and they need time to recover their strength. However, sometimes they do not have sufficient time to recover, because they need to feed their babies using baby bottles which they must hold with their own hands, unless they feed their own milk to their babies.

The present invention has been developed by the inventor with the objective that it can take the place of a mother's hand steadily holding a milk bottle from which her baby can take milk smoothly and, thus, alleviate a mother's work to a considerable degree so that she may acquire enough rest.

SUMMARY OF THE INVENTION

The present invention is directed a baby bottle holder which consists of a grasping means for gently attaching the baby bottle holder to a baby, a bottle holder means which is mounted on the grasping means, and an attachment means for securely attaching the bottle holder means to the grasping means. The grasping means is made of soft and flexible material. It is placed around and holds a baby's breast. The bottle holder means holds a baby bottle by use of its clamp.

A main function of the present invention is that it can be placed around a baby's body, so as to enable even a little older baby to take milk from the bottle, even if it should turn its body to its side.

DETAILED DESCRIPTION OF THE INVENTION

Figure 1:
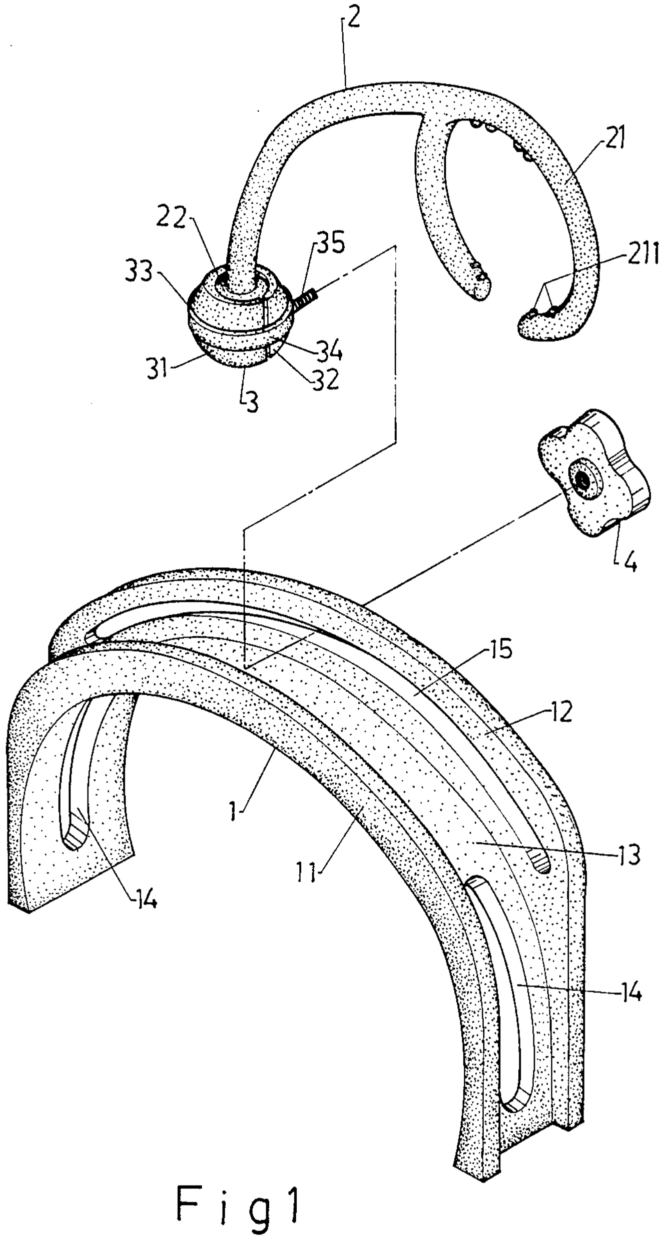
FIG. 1 is an explosive perspective view of the baby bottle holder of the present invention.
Figure 2:
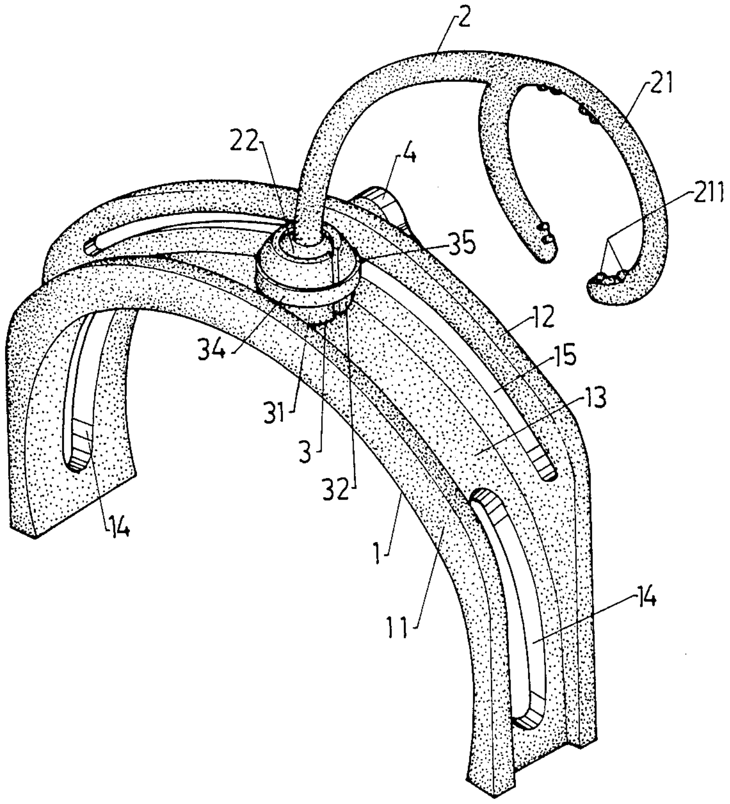
FIG. 2 is a view of a baby bottle holder combined together as described in the present invention.

The present invention, a baby bottle holder, consists of a baby grasping means or, simply, grasping means 1 and bottle holder means 2 with an attachment means located at one end thereof as shown in FIGS. 1 and 2.

The grasping means 1 has edges 11, 12 which protrude lengthwise and a flattened middle section with an arch curvature about its thickness 13 between said two protruding edges. A lengthwise slot 14 is respectively provided at each end of middle section 13 and a curved slot 15 is provided a little under and along protruding edge 12.

The bottle holder means, or simply, holder means 2 has a curved arm with a baby bottle clamp 21 at one end and a ball means 22 at another end. The baby bottle clamp 21 may be provided with a plurality of projection means or teeth 211 at its inside wall for providing increased holding of a baby bottle.

Figure 3:
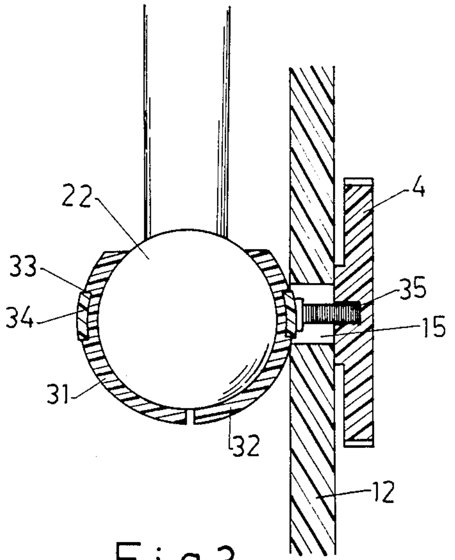
FIG. 3 is a cross-sectional view of the bottle holder means mounted on the grasping mean in accordance with the present invention.

The attachment means includes ball means 22 which is enveloped with ball cover 3, which has two semi-circular pieces 31, 32, with ring dent 33 as shown in FIG. 3, covered by ring cover 34 which has a bolt means 35 affixed to its rear side.

When bolt means 35 is positioned to pass through curved slot 15 of protruding edge 12, nut means 4 can be screwed onto bolt means 35 to securely fasten the holding means 2 on the grasping means 1. Loosening and tightening of nut means 4 makes it possible to change the location of bottle holding means 2 on the grasping means 1 to anywhere along the curved slot 15.

Ring cover 34 should be constructed to protrude a little higher than the surface of ball cover 3 with a portion thereof protruding into slot 15 when bottle holding means 2 is screwed tightly on the grasping means 1. This assures that bottle holding means 2 never moves. See, for example, FIG. 3.

The curved arm of the bottle holding means 2 is attached to ball means 22 through an opening at the top of ball cover 3. This construction allows bottle holding means 2 to rotate within cover 3 so that it can turn to a considerable degree, thereby widening the effective work radius of bottle clamp 21 so that it can adjust with the movement of a baby's head.

Figure 4:
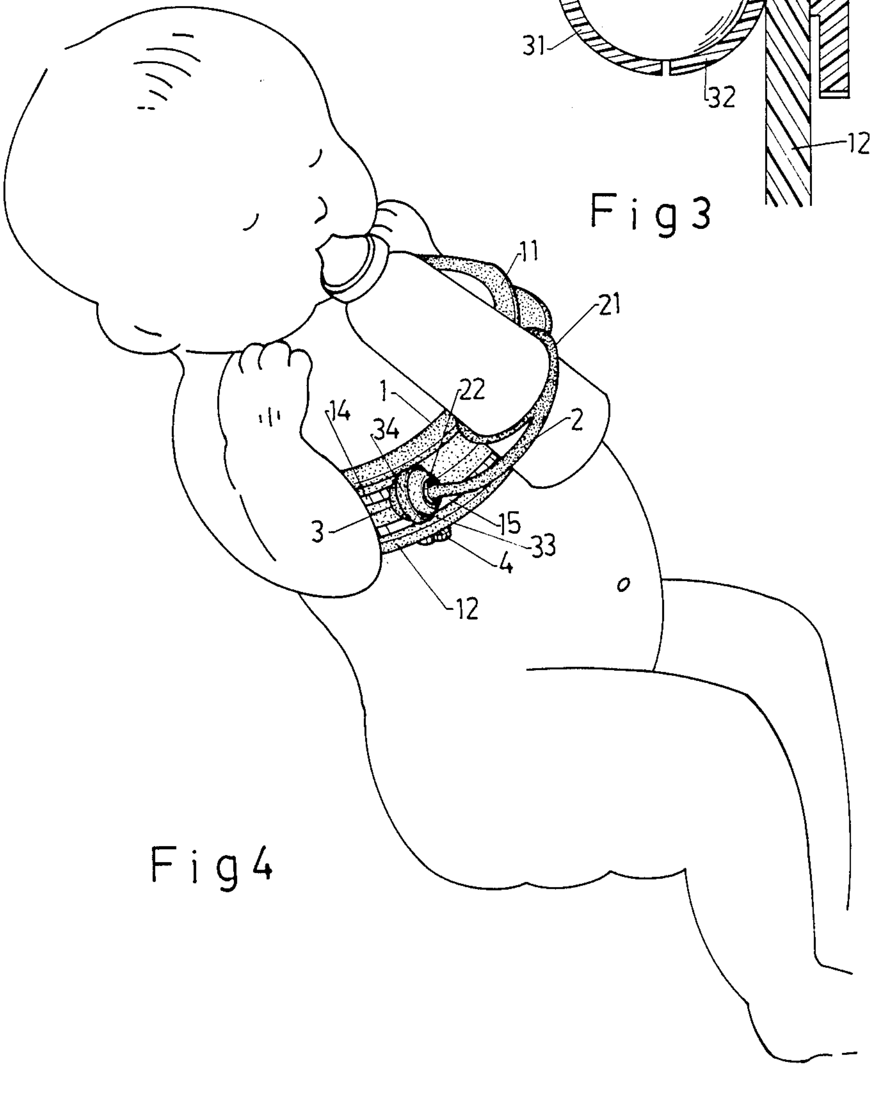
FIG. 4 is a view of the baby bottle holder practically used in the present invention.

A manner of using the baby bottle holder of the present invention is shown in FIG. 4. At first baby attachment means 1 is placed around a baby's breast, and then a bottle filled with milk is placed into bottle clamp 21, which holds the bottle. Lastly, holder means 2 is secured tightly on the grasping means 1 by tightening nut 4 on bolt 35. Thus, the baby's mother does not need to hold the milk bottle with her own hand, but only needs to watch how her baby takes the milk.

The baby attachment means 1 can be made of a kind of soft and flexible material which will not harm a baby when it is placed around the baby's body.

Figure 5:
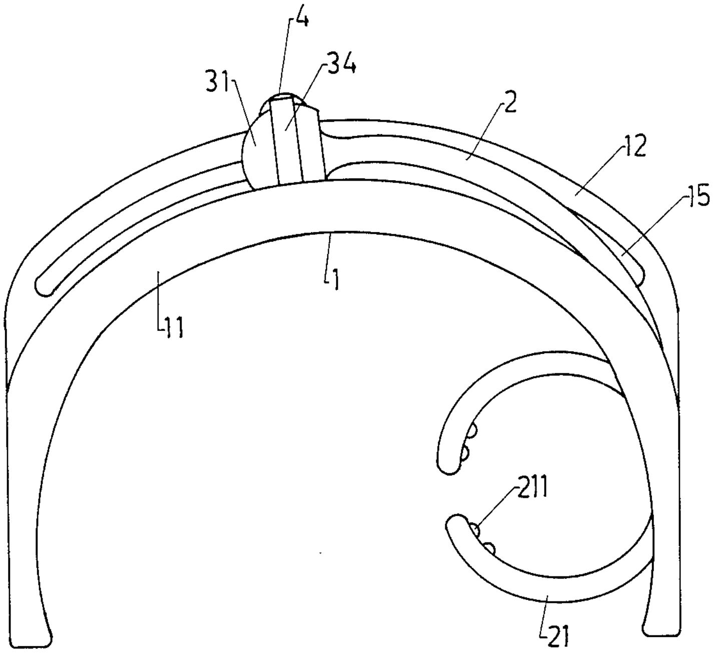
FIG. 5 is a view of the baby bottle holder arranged for storage in accordance with the present invention.

Bottle clamp 21 can be inserted into lengthwise slots 14 in order to reduce the overall dimensions of the present invention for purposes of storage, as shown in FIG. 5.

I claim:

1. A baby bottle holder which comprises a grasping means for gently grasping a baby, a holder means for holding a baby bottle, and an attachment means for movably and removably attaching the holder means to the grasping means,
   - the grasping means having a flattened middle section having an arch curvature about its thickness, two edges protruding from longer edges from the flattened middle section, and a slot located along a portion of at least one of the two edges,
   - the holder means having an arm, a baby bottle clamp connected to one end of the arm and the attachment means located at another end of the arm, and
   - the attachment means having a ball means connected to the other end of the arm, a cover enveloping the ball means, the cover having a ring cover at a middle portion of the ball means, the ring cover having a bolt means connecting thereto and a nut means associated therewith, the bolt means passing through the slot of the grasping means, and the nut means tightening on the bolt means to movably and removably attach the holder means to the grasping means.

2. The baby holder of claim 1, wherein a plurality of teeth of provided on an inner surface of the baby holder clamp.

* * * * *